Dec. 26, 1939.                A. N. ALEXANDER                2,184,630
                          PORTABLE BELT VULCANIZER
                    Filed Feb. 17, 1938           2 Sheets-Sheet 1
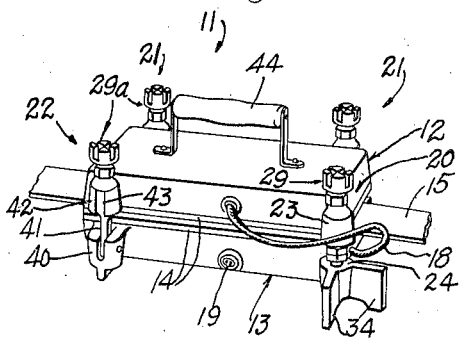
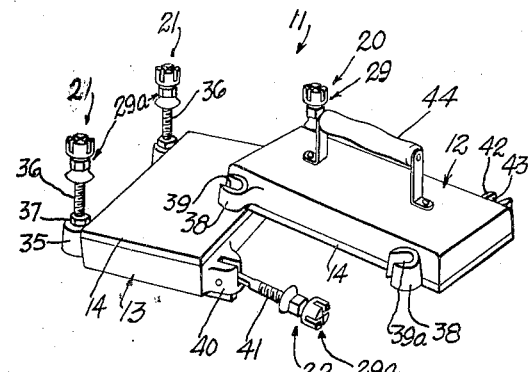
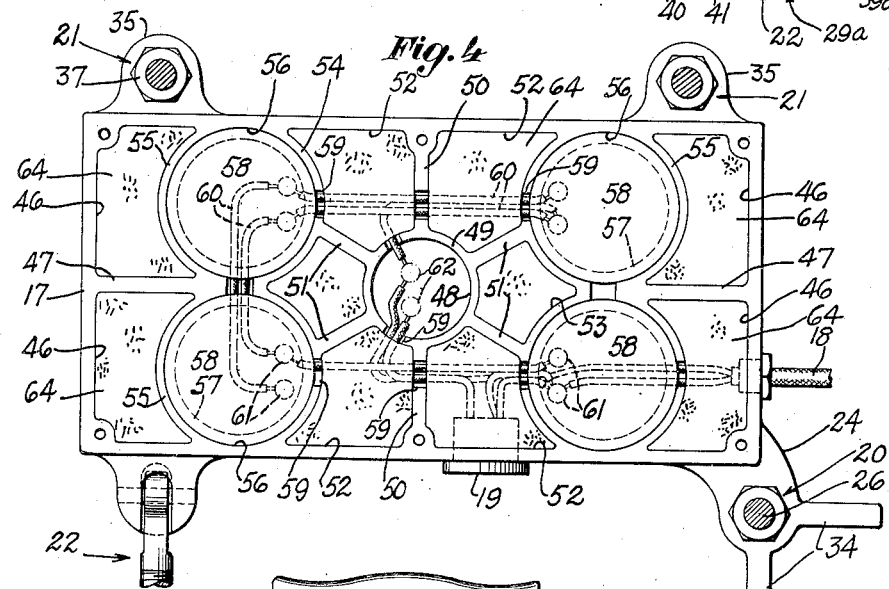
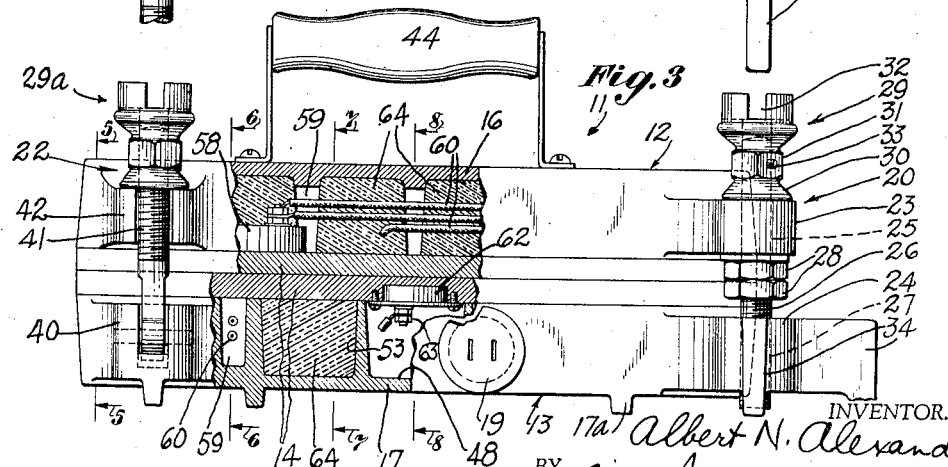
INVENTOR.
Albert N. Alexander
BY Louis Shumacher
ATTORNEY.

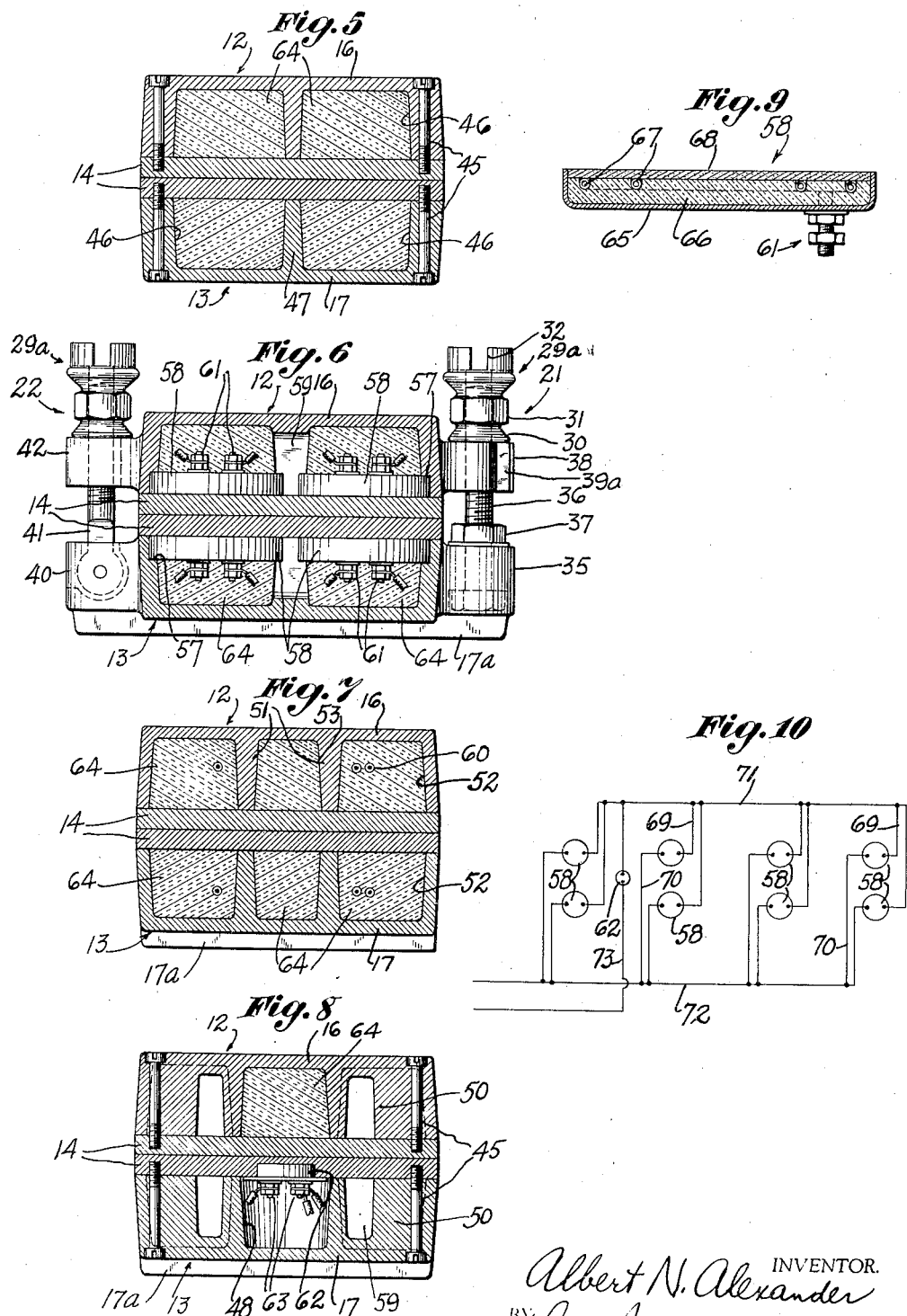

Patented Dec. 26, 1939

2,184,630

UNITED STATES PATENT OFFICE 2,184,630

PORTABLE BELT VULCANIZER

Albert N. Alexander, Brookline, Mass., assignor to Ton-Tex Corporation, Grand Rapids, Mich., a corporation of Michigan Application February 17, 1938, Serial No. 190,920

2 Claims. (Cl. 18—6)

This invention relates to vulcanizing methods and to vulcanizers particularly of the portable type.

One object of the invention is to provide a vulcanizer of the character described having improved means permitting swinging, alining, guiding and clamping actions in the operation of the vulcanizer platens and their associated parts, so as to assure that the accurate assembly of work to be vulcanized shall not be disturbed in closing the vulcanizer, in lowering the upper platen and in applying pressure on the work, and the vulcanizer having the further advantage that the improved means thereof permits the several results to be obtained in a relatively small, compact, light weight and relatively inexpensive vulcanizer of the single unit portable type.

Another object of the invention is the provision of a vulcanizer of the nature set forth having improved means such that the vulcanizer is adapted to act on machine shop belts of widely varying widths, without removing the belts from their pulleys.

Another object of the invention is to furnish such vulcanizer which can be readily and quickly assembled and disassembled so that the platens may be used in vulcanizing belts of greater size than the platens.

Another object of the invention is to construct a portable vulcanizer as herein mentioned, wherein improved means prevents tilting thereof on swinging movement of a platen.

Another object of the invention is to provide a portable vulcanizer having improved means including heating elements for the upper and lower platens, the heating elements being in a common circuit controlled by a single thermostat.

Another object of the invention is to furnish a portable vulcanizer having improved heat supplying and distributing means so as to assure such a high degree of temperature uniformity along the platen surface as to permit close and accurate thermostatic control, whereby higher vulcanizing temperatures may be practised than has heretofore been practicable with portable vulcanizers, with consequent great increase in the speed of vulcanization.

Another object of the invention is the provision of a portable vulcanizer having parts coacting with each other in an improved manner for very inexpensive and rapid assembling in constructing the vulcanizer.

A further object of the invention is to provide an improved method of vulcanizing belts to obtain superior penetration and speed of vulcanization.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a perspective isometric view of a vulcanizer embodying the invention, in closed position.

Fig. 2 is a similar view thereof in open position.

Fig. 3 is an enlarged longitudinal view in elevation of the vulcanizer with parts removed and in section.

Fig. 4 is an enlarged top plan view of the bottom casing member, the platen thereof being removed.

Figs. 5, 6, 7 and 8 are sectional views taken respectively on lines 5—5, 6—6, 7—7, and 8—8 of Fig. 3.

Fig. 9 is a sectional view of a heating element.

Fig. 10 is a diagrammatic view of the electrical circuit.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification.

Generally described, this invention provides a portable vulcanizer for vulcanizing together in situ the ends of broken belts that are used to drive machinery in shops and the like. Such belts must be vulcanized in accurate alinement with each other so that the belts may run true. To avoid undue stoppage of the machinery, the vulcanization should be accomplished rapidly, and the vulcanizer should be inherently adapted for accurate work in a manner which is convenient for the treatment of an overhead belt. This invention provides a portable vulcanizer whose mechanical construction is such that it will not disturb the joint in the belt while the vulcanizer is being closed thereon, nor while the vulcanizer is being clamped on the joint. And the heating means is of such uniformity that excessive surges in temperature are avoided, so that the usual thermostat may maintain a uniform temperature, whereby a higher vulcanizing temperature is available, which, with the superior uniformity of heat throughout the platen area, will permit rapid accurate and reliable vulcanization. Among other things it may be mentioned that the casing for the platen is internally ribbed and is of sufficient mass to afford an ample heat reservoir, with the heating elements being set into wells in the casing, so as to distributively apply heat to the platen. The central part of the platen tends to have a maximum temperature but this is prevented by the arrangement of the heating elements and by providing a platen of ample body and permitting outward flow of heat along the platen. Preferably, the thermostat is responsive to the temperature of the central region of the platen.

Referring in detail to the drawings, 11 denotes a portable vulcanizer embodying the invention. The same includes upper and lower vulcanizer members or heads 12, 13 having confronting platen portions 14 to act upon a vulcanizable element such as a belt 15. Preferably heat is electrically imparted to both platens, for reasons hereinafter explained, and hence the heads 12, 13 comprise the respective casings 16, 17 for housing the heating elements as well as for reenforcingly operatively mounting their individual platens. The lower casing may have its under surface ribbed as at 17a. The heating elements may be connected in a single thermostatically controlled circuit by a flexible lead 18, with the current supplied at a conventional type plug connection 19.

For operatively associating the heads 12, 13 in a unitary portable vulcanizer, I provide a series of clamping devices 20, 21, 22, of which the device 20 is an elevating and lowering means for the upper head 12 and affords a fulcrum for free lateral swinging movement of the head 12 to open position as shown in Fig. 2, desirably at any point in the elevated position of said head. Preferably, the arrangement is also such that the same part which is manipulated to cause the clamping action of the device 20, serves to cause the elevating and lowering action thereof. By arranging the devices 20, 21, and 22 at the corners of the oblong vulcanizer, a maximum unobstructed platen area is available, and whereby the belts may be placed lengthwise of the vulcanizer or crosswise thereof depending upon the widths of the belts to be acted on.

Specifically the device 20 may comprise a pair of laterally projecting lugs 23, 24 on the upper and lower heads 12, 13, respectively. Centrally formed in the upper lug 23 is a bore 25, adapted to freely receive a vertical screw 26 which is removably threaded into a passage 27 of the bottom lug 24. The latter and its screw passage are relatively deep to afford considerable range of movement of the screw 26. In order to rotatably mount the member 13 at a fixed point of the screw, a plurality of nuts 28 are provided on the screw in locking interengagement. To facilitate actuation of the screw 26, the same may have a special clamping head 29, comprising a bearing shoulder 30 seated on the lug 23, above which shoulder is an hexagonal head 31 or the like, surmounted by a head portion having a pair of transverse kerfs 32, so that the screw 26 may be turned by a wrench placed at the hexagonal head 31 or by a bar inserted in a kerf 32. If desired, the clamping head 29 may be formed separately of the screw 26 and pinned thereto as at 33, or otherwise secured.

To prevent tilting of the vulcanizer 11 in the open position thereof, the lug 24 may have a plurality of laterally extending feet 34 at right angles to each other, to serve to counteract the weight of the upper head 12.

Along a longitudinal side of the vulcanizer 11 are provided a pair of devices 21. Each of these may include a bottom lug 35 fixed to the head 13 into which are threaded the vertical rigid screws 36 which are held fixed by the locknuts 37. At the upper ends of these screws are the clamping heads 29a which are like those shown at 29, except that they are threadedly engaged with the screws 36. Formed on the upper head 12 are the lugs 38 having slots 39 and 39a disposed at proper angles to laterally receive their respective screws 36, upon swinging movement of the upper vulcanizer head 12 to closed position.

The device 22 may be arranged so as to avoid obstruction of the upper head 12 in the horizontal movement thereof. Hence it may include a lower lug 40 secured to the bottom head 13, and which is arranged to pivotally mount the screw 41 to function as a drop bolt. The latter may have a clamping head 29a to engage over a lug 42 that is slotted at 43 to receive the bolt.

It will be observed that the several lugs of the devices 20, 21 and 22 are spaced above and below the planes of the platen surfaces, whereby, on removal of the screws 26, 36 and 41, the vulcanizer heads can be disposed to vulcanize a belt much larger than the platen area. In such unusual case, the clamping action may be supplied by any suitable means.

The operation of the invention as thus far described, will now be pointed out. In the open position shown in Fig. 2, the upper vulcanizer head 12 is in laterally swung position so as to leave the lower head 13 unobstructed. It has also been elevated by turning the clamping head 29 to turn the screw 26. In this position, the laterally extending feet 34 render the vulcanizer perfectly stable. Now the operator places a belt such as 15 lengthwise or crosswise of the lower vulcanizer head, depending upon the width of the belt, the different clamping devices leaving the platen area unobstructed. When the prepared alined ends of the belt have been carefully placed on the lower head, the elevated upper head 12 may be swung to closed position without contacting or disturbing the belt. This movement of the head 12 may be facilitated by a handle 44 secured thereto. In this closing movement, the rigid screws 36 are received in the lug slots 39, 39a which cooperate in stop engagement therewith to assure alinement of the vulcanizer heads. Now the bolt 41 is thrown into operative position, and the clamping head 29 is manipulated to lower the upper head 12, which thus moves in guide engagement with the stop bolts 36. Thus any possibility of disturbing the alinement of the belt assembly is avoided. Now the different clamping heads 29, 29a are repeatedly successively operated to exert the required even pressure on the belt. When the vulcanization has been completed, the different clamping heads are loosened, the bolt 41 permitted to drop out of the way, and the clamping head 29 serving to elevate the upper head 12 so that it can be readily laterally swung to open position about the screw 26 acting as a pivot.

While any suitable kind of heating means and arrangement may be used in the portable vulcanizer as thus far described, I prefer to provide an improved heating means which shall afford a higher degree of temperature uniformity than was heretofore attainable in portable vulcanizers, and which shall be substantially as good as that afforded by large stationary vulcanizers. This permits me to use maximum vulcanizing temperatures, whereas it was heretofore necessary to use lower temperatures with consequent loss of time, and often incomplete or imperfect vulcanization.

Referring again to the drawings, the casings 16, 17 in which the heating means are housed, are internally exactly alike, so that it will be necessary to describe only one of them. As shown in Fig. 4, the casing 17 is formed with a series of ribs or partitions providing a plurality of compartments which are the full depth of the casing and open upward to be closed by the platen 14 that may be secured by screws 45. For example, the end portions of the casing have transversely disposed end compartments 46, separated by ribs 47. The central transverse region of the casing is formed with a center compartment 48, from the wall 49 of which radiate a series of equally angularly spaced ribs 50, 51 to form compartments 52, 53. Intermediate of the central and end regions referred to, are the circular ribs 54 which afford two sets of transversely arranged compartments 56, these having annular shoulders 57 for seating the circular heating means 58 as shown in Fig. 6. Interrupting the ribs 49, 50 and 54 are the open ended recesses or passages 59 through which may pass the conductor leads 60 that interconnect the heating elements 58 at the terminals 61 thereof, with each other and with the thermostat 62 (see Fig. 8) at the terminals 63 thereof. Through these passages, the conductor leads may also extend to the flexible connector 18 and to the plug fitting 19. The specific circuit arrangement will be described hereinafter in accordance with Fig. 10.

The several compartments such as 46, 52 and 53 are wholly filled with insulation 64. The compartments 56 are also filled with insulation up to the level of the shoulders 57. The center compartment 48 of the upper casing is wholly filled with insulation, whereas the corresponding compartment 48 of the lower casing 17 may be free of insulation to afford plenty of space for the thermostat wiring.

It will be seen that with the described arrangement, on removal of a platen, it is possible to readily remove the heating elements and the wiring without disturbing their interconnected relation, so that inspection and repair can be readily accomplished. For this reason, the insulation is preferably of a loose, powder form.

The heating element 58 may include a metallic casing 65 having porcelain insulation 66 therein for the electrical resistance coil 67, surmounted by a sheet of metal or a layer of vitreous cement 68 that faces the platen. However, any suitable type of heating element may be used.

In Fig 10, the heating elements 58 for the upper and lower vulcanizer heads are shown connected in parallel by wires 69, 70 across the lines of a circuit 71, 72 with the circuit being completed through the single thermostat 62 by the conductor 73. Thus when the thermostat opens, the circuit for all the heating elements is broken.

The operation of the heating means in the portable vulcanizer will now be described. The usual practice is to supply the required current to the vulcanizer for a determined time period to thoroughly heat the same before vulcanization is attempted. According to my invention, the casing and its ribs afford sufficient mass or body for the storage of an adequate amount of heat to supply heat for vulcanization when the thermostat switch is open, whereby to even out the temperature performance of the vulcanizer. But this heat storage principle can be efficiently used only if a high degree of temperature uniformity is available throughout the platen area. The latter result is accomplished by providing the large central insulator region and the narrow end insulator regions, whereby the heat surge occurs in required proportions toward the ends and center of the vulcanizer from the intermediate regions at which the heating elements are located. In other words, heat is not imparted directly to the central region of the platen, but to intermediate areas thereof. Since the heating elements 58 are sunk in the walls 56, the heat flows through the casing and along the thick platen to the central region thereof. But the thermostat is located at the central region since heat tends to accumulate there. By combining these principles, the ideal condition is obtained in respect to temperature uniformity in a portable vulcanizer, whereby a higher vulcanizing temperature can be used than was heretofore possible in a portable vulcanizer, and a great saving in time effected, while superior and stronger work of substantially uniform excellence is obtained. And these advantages are realizable in a vulcanizer which is so small and light in weight that it can be used on line belts, without dismounting the latter.

I claim:

1. A portable heated vulcanizer having upper and lower horizontal rectangular members provided with confronting platen portions, a first clamping screw threadedly mounted with respect to the lower member adjacent to one corner thereof, the upper member being rotatably mounted with respect to said screw whereby it may rotate about the latter as a pivot, a second clamping screw fixed to the lower member at the opposite side thereof from the first screw, and serving as a stop to limit the swinging movement of the upper member at a point in operative alinement with the lower member, means for releasably clamping the upper member to the second screw, and a third clamping screw swingably mounted on the lower member at the same side thereof as the first screw.

2. A portable heated vulcanizer having upper and lower horizontal chambered rectangular members having confronted individually heated parallel platens, said members having laterally projecting corner lugs, a first vertical clamping screw threaded in a lug of the lower member and passing freely through the corresponding lug of the upper member whereby the upper member may rotate about such screw as a pivot, means on the said first screw engaging the last mentioned lug on the upper member to prevent relative vertical movement between the first screw and the upper member, other vertical clamping screws fixed on the two lugs of the bottom member along the opposite side thereof from the first screw, the corresponding lugs of the upper member having slots at angles such that the slots can receive the clamping screws on swinging movement of the upper member so that the clamping screws can interengage said lugs and serve as lateral stops for causing alinement of said members, a downwardly swingable clamping screw and nut unit mounted on the remaining lug of the lower member and located on the same side as the first screw, the corresponding lug of the upper member being slotted for engaging the said unit, and outward projecting foot means on the bottom lug of said first screw to prevent tilting of the device.

ALBERT N. ALEXANDER.